United States Patent [19]

Hoffman, Jr. et al.

[11] Patent Number: 4,458,790

[45] Date of Patent: Jul. 10, 1984

[54] CALIPER MOUNTING SUSPENSION

[75] Inventors: Charles T. Hoffman, Jr., Waynesville; Robert M. Carpenter, Centerville, both of Ohio

[73] Assignee: General Motors Corporation, Detroit, Mich.

[21] Appl. No.: 341,111

[22] Filed: Jan. 20, 1982

[51] Int. Cl.³ .......................................... F16D 55/224
[52] U.S. Cl. ................................. 188/71.8; 188/73.44; 188/196 P; 277/101; 277/208; 277/212 FB
[58] Field of Search ................. 188/73.44, 73.45, 71.8, 188/73.31, 196 P; 277/101, 207 R, 208, 212 FB, 212 C, 237 A, DIG. 4

[56] References Cited

U.S. PATENT DOCUMENTS

| | | | |
|---|---|---|---|
| 3,628,639 | 12/1971 | Daley | 188/73.3 |
| 3,917,032 | 11/1975 | Hoffman, Jr. et al. | 188/73.3 |
| 3,952,840 | 4/1976 | Yamazaki et al. | 188/71.8 |
| 4,046,232 | 9/1977 | Kellogg | 188/73.1 |
| 4,265,340 | 5/1981 | Scott et al. | 188/73.3 |

FOREIGN PATENT DOCUMENTS

| | | | |
|---|---|---|---|
| 2931804 | 4/1981 | Fed. Rep. of Germany | 188/73.44 |
| 2031537 | 4/1980 | United Kingdom | 188/73.45 |

Primary Examiner—Bruce H. Stoner, Jr.
Assistant Examiner—Michael P. Gilday
Attorney, Agent, or Firm—D. D. McGraw

[57] ABSTRACT

Resilient rings are fitted between the caliper and the mounting bolts to provide free caliper movement and permanent corrosion protection. One resilient ring has internal lands contracting the mounting bolt and positioned within the caliper. The lands act as a rubber spring with memory which retracts the caliper, reducing brake drag. Reduced rubber contact area with the mounting bolt reduces adhesion of the rubber to the bolt. The resilient ring may alternatively have external lands which grip or slip on the caliper housing instead of the mounting bolt. A seal may be provided as an extension of the one resilient ring to protect the mounting bolt surface.

1 Claim, 3 Drawing Figures

CALIPER MOUNTING SUSPENSION

The invention relates to a disc brake assembly, and more particularly to one having an axially fixed disc and an axially slidable caliper. In the embodiments illustrated, the caliper transmits brake torque to a fixed support member along one side of the disc while the caliper is slidably mounted on one or more mounting bolts and guide pins which are secured to the fixed support member and extend axially parallel to the axis of the disc being braked and substantially perpendicular to the disc braking surface. The invention herein disclosed and claimed may be used in a disc brake assembly having the single mounting and guide pin arrangement of U.S. Pat. No. 3,917,032 issued Nov. 4, 1975; or one having a plurality of mounting and guide pins or bolts as shown in U.S. Pat. No. 4,046,232 issued Sept. 6, 1977.

It is a primary feature of the invention that at least one of the resilient rings or bushings positioned between a mounting bolt or guide pin surface wall and the orifice wall of the caliper housing is cylindrically formed with a continuous cylindrical first peripheral surface engaging one radially adjacent wall and a multiple land-and-groove second peripheral surface defining a plurality of lands and grooves with only the land portions of the second peripheral surface frictionally engaging the other radially adjacent wall. This provides a caliper retraction and adjustment mechanism in which during brake application the land portions are axially deformed under axial loading to store retractive energy. Upon brake release the deformed lands utilize the stored retractive energy to retract the caliper housing relative to the mounting bolt or bolts. This also provides adjustment for brake lining wear when necessary. The land portions, having less gripping area than the continuous cylindrical peripheral surface, will allow slippage relative to the adjacent wall engaged by them if and when during brake application the caliper housing is axially moved relative to the mounting bolt or bolts for a distance greater than land portion deformation permits. This establishes an adjusted position of the land portions where they engage the adjacent wall so that upon brake release the retracted position of the caliper housing is adjusted for brake wear.

It is another feature of the invention to provide a flexible extension or seal extending from the land-and-groove formed resilient ring and covering a substantial portion of the mounting bolt extending outwardly of the caliper housing mounting orifice, the other end of the extension being secured to the mounting bolt. The extension thus provides a flexible seal which protects the mounting bolt surface which can engage the land portions of the main body of the resilient ring as the brake assembly is actuated and the brake shoes wear until the above described adjustment occurs one or more times.

IN THE DRAWING

Figure 1:
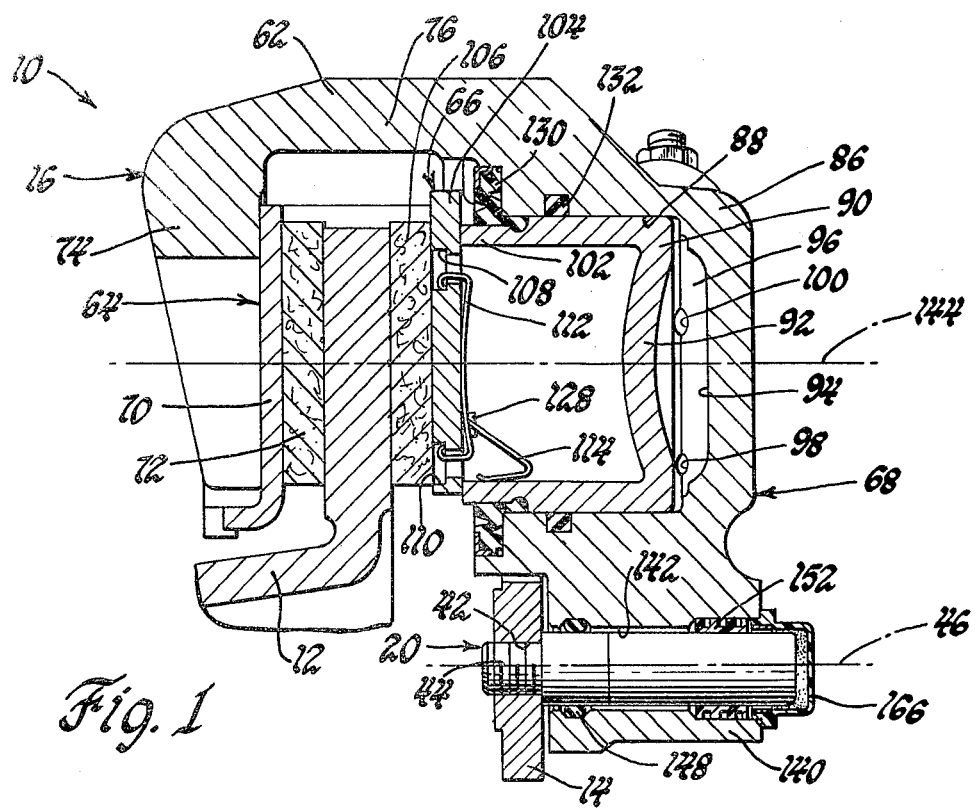
FIG. 1 is a cross section view of a disc brake assembly embodying the invention and having parts broken away.

The disc brake assembly 10 is illustrated in FIG. 1 as including a disc 12, a fixed support bracket 14 and a caliper assembly 16. The disc is mounted so as to rotate about its axis with a vehicle wheel, as is well known in the art, and the support bracket is secured to a suitable non-rotating portion of the vehicle such as the steering knuckle of a front wheel suspension assembly. The caliper assembly is mounted on the support bracket so as to be slidable in a direction which is parallel to the disc axis of rotation. The caliper assembly is mounted on the fixed support bracket 14 by one or more mounting pins or bolts 20.

The fixed bracket 14 is illustrated as being a welded or stamped bracket suitably fixed to a vehicle member. Other types of bracket manufacture may be utilized. In some installations the bracket may be cast as an integral part of the steering knuckle, for example. Such installations have been used in production vehicles and are well understood by those skilled in the art.

The bracket is provided with one or more threaded apertures 42 which are axially parallel to the disc axis of rotation and which provide the arrangement for securing one or more mounting bolts 20 to the bracket. Although two mounting bolts 20 may be provided and utilize the invention in the general arrangement of U.S. Pat. No. 4,046,232 noted above, further description will relate to an arrangement wherein only one mounting bolt is used, as shown in U.S. Pat. No. 3,917,032 noted above. It is to be understood, however, that the structures described below and embodying the invention may be used in a disc brake assembly having a plurality of mounting bolts.

Mounting bolt 20 includes an outboard threaded end 44 which is threaded into aperture 42 so that the bolt extends with its axis 46 parallel to the disc axis of rotation. Also, bolt 20 extends outwardly of bracket 14 in the direction away from disc 12. As is better seen in FIG. 3, bolt 20 has a shoulder 48 formed thereon and positioned generally in the center of the length of the bolt. The outer surface 50 of the bolt extending away from shoulder 48 is of a larger diameter than the threaded end 44 and provides a sliding surface wall for the caliper housing. A sleeve 52 of the same outer diameter as the bolt outer surface 50 is received about a portion of the bolt threaded end 44 and has one end abutting bracket 14 circumferentially about aperture 42 and the other end abutting bolt shoulder 48. The inboard end of bolt 20 has a socket 56 recessed therein and arranged to receive a suitable tool for installing and removing the bolt. When the bolt is tightly threaded into aperture 42, sleeve 52 is placed in compression and provides a greater effective length for the threaded portion of the bolt, thereby improving the retentive characteristics of the bolt. This arrangement is similar to that disclosed in U.S. Pat. No. 3,628,639, issued Dec. 21, 1971.

The caliper assembly 16 includes a caliper housing or frame 62 which may be slidably mounted on bracket 14 as is well known in the art, an outboard brake pad assembly 64, an inboard brake pad assembly 66, and a piston and cylinder section 68. The outboard brake pad assembly 64 includes a shoe 70 and a brake lining 72 secured to the shoe. The outboard leg 74 extends radially inward from the frame bridge section 76 along the outboard side of the disc 12. Assembly 64 is suitably mounted on the caliper frame outboard leg 74 to prevent radial and arcuate movement of the assembly 64 and to transmit braking forces from the assembly to the caliper frame.

The inboard leg 86 of the caliper frame is formed with a cylinder 88 in which piston 90 is reciprocably received. Cylinder 88 and piston 90 are parts of the piston and cylinder section 68. Piston 90 has a head 92 cooperating with cylinder 88 and the cylinder end wall 94 to define the actuating chamber 96. Pressure opening 98 and bleed opening 100 are provided so that hydraulic brake fluid introduced into chamber 96 through opening 98 when the brake actuated, and air may be bled from the brake through opening 100 when necessary. The outer end 102 of piston 90 engages the back side of shoe 104 of inboard brake pad assembly 66. The shoe 104 has a lining 106 secured to the other side thereof and positioned for braking engagement with the inboard side of disc 12. Shoe 104 has a pair of shouldered apertures 108 and 110 which provide a mounting for shoe retaining spring 112. Spring 112 is clipped to the back side of brake shoe 104, with hooked ends engaging the shoulders of the apertures so as to hold the spring in position. The spring has a leg 114 extending inwardly into piston 92 and resiliently engaging the piston inner surface so that the brake pad assembly 66 is urged radially outwardly relative to the disc 12. The shoe 104 suitably engages a mating portion of the caliper bridge section 76 so that it is positioned in the caliper in proper relation to the disc and braking forces from pad assembly 66 are transmitted to the caliper frame 62. The brake shoe 104 is also provided with a pair of buttons 128 on either side of spring 112 and so spaced that they are in incipient engagement with the inner surfaces of piston 90 so that they further assist in locating the brake pad assembly 66.

A dust seal or boot 130 is secured to the piston 90 and in the outer end of the cylinder 88. A pressure seal 132 is received in a seal recess formed in the wall of the cylinder 88 and engaging the outer surface of piston 90. The seal retains hydraulic fluid within chamber 96.

The inboard caliper leg 86 extends radially inward from the cylinder section 68 relative to disc 12 and terminates in an ear 140. Two such ears are provided when two mounting bolts are used, as shown in U.S. Pat. No. 4,046,232 noted above. Bore 142 is formed through ear 140 so that it is axially parallel to the axis 144 of piston 90 and cylinder 88 and provides a mounting orifice. The inner wall 134 of bore 142 is adjacent to but radially spaced from the outer surface of wall 50 of mounting bolt 20 and the continuing outer surface or wall of sleeve 52. For purposes of defining the invention the wall formed by the outer surface 50 of bolt 20 and the outer surface of sleeve 52 is considered to be one continuous wall of the mounting bolt. A recess 146 is formed in the bore surface of the bore 142 near the bore and extends toward disc 12. Resilient ring or bushing 148 is received in recess 146 and engages the outer surface of sleeve 52 and the recessed part of the wall 134.

The inboard end of bore 142 is defined by another recess 150 which extends axially inward from the inboard bore end. Another resilient ring or bushing 152 is received in recess 150 and engages the outer surface or wall 50 of mounting bolt 20 and the recess wall 154, which is a recessed part of wall 134. Resilient ring 152 is cylindrically formed with a continuous peripheral inner surface 156 frictionally engaging and gripping the radially adjacent wall 50. The outer peripheral surface 158 of ring 152 is formed to provide a plurality of lands 160 alternating with grooves 162. The radially outward end surface 164 of the lands 160 frictionally and grippingly engage the radially adjacent wall 154. Rings 148 and 152 are preferably slightly loaded radially to assure their sealing engagement with their radially adjacent walls. Ring 152 may be radially loaded to a greater extent than ring 148 to obtain the desired frictional gripping action. A cup-like seal 166 is fitted over the inboard end of mounting bolt 20 and secured in the end of bore 142 by suitable means such as retainer 168.

Figure 3:
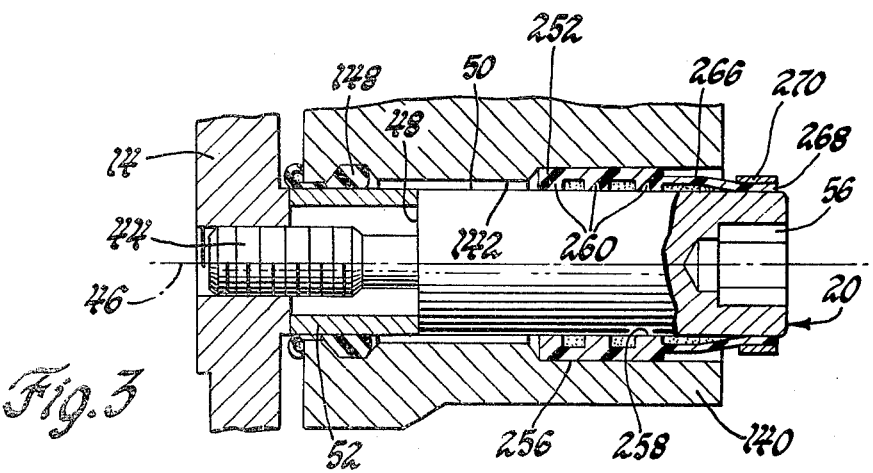
FIG. 3 is similar to FIG. 2 and shows another embodiment of the invention.

The modification of the invention illustrated in FIG. 3 has a ring 252 similar to ring 152 but with the continuous peripheral surface 256 being the outer surface, and the land-and-groove peripheral surface 258 being the inner surface. Also a generally cylindrical flexible extension 266 extends from one end of ring 252 outward of the inboard end of bore 142 and terminates at or near the inboard end of mounting bolt 20. The open end 268 of extension 266 is sealingly secured to bolt 20 by suitable means such as retainer 270. Extension 266 provides a flexible seal which protects the surface section of bolt wall 50 which can engage ring 252 as the brake is actuated and as the brake shoes wear. Extension 266 is radially of less thickness than the radial spacing between the radially adjacent walls 50 and 154 so that it can flex between these walls in its portion axially between the main body of ring 266 and retainer 270.

The caliper assembly is illustrated in the drawing in the mounting position assumed when the brake linings are unworn. Each time the brake is actuated, piston 90 forces lining 106 into braking engagement with disc 12 and hydraulic reaction acting on the cylinder end wall 94 urges the caliper frame 62 rightwardly as seen in FIG. 1 to force lining 72 into braking engagement with the other side of disc 12. Sliding movement of the caliper frame rightwardly on mounting bolt 20 occurs. This is initially due to taking up any clearance between the linings and the disc, slight compression of the linings, and spread of the caliper legs. Lands 160 or 260 are axially deformed under the axial loading caused by movement of the caliper housing 62 relative to the mounting bolt or bolts 20, storing retractive energy. As the brake is released the caliper legs recover, as do the linings, and the caliper frame is returned to substantially the same position as before. The return or retractive movement of the caliper housing or frame 62 is obtained by using the stored retractive energy in the lands 160 or 260 as the lands return to their axially undeformed condition shown in the drawing. As the brake linings wear, however, the caliper frame must be moved further rightwardly while the piston 90 is moved, further leftwardly relative to the release position illustrated. The seal 132 will grip the piston 90 so that it does not return to the release position, and bushings 148 and 152 or 252 will act in a similar manner between the bore 142 and the pin and sleeve bolt 20 extending therethrough. It can be seen that as the linings become more worn, the caliper housing is positioned further and further rightward on bolt 20 and sleeve 52. Resilient ring 148 slides on the outer surface of sleeve 52 and the radial ends of lands 160 or 260 slide on the adjacent wall engaged by them after having been axially deformed, thus adjusting for lining wear.

Figure 2:
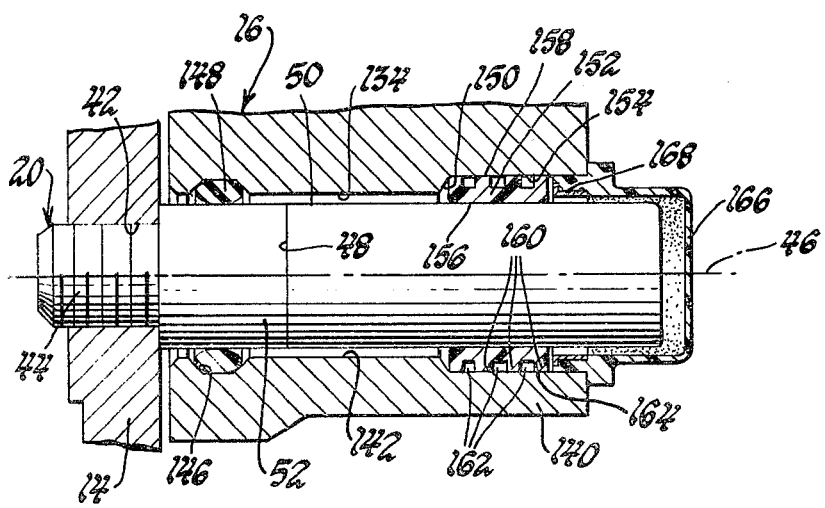
FIG. 2 is an enlarged fragmentary cross section view of portion of FIG. 1 illustrating an embodiment of the invention in greater detail.

Resilient ring 148 and recess 146 may be constructed in a similar manner to that of resilient ring 152 and recess 150 if more retractive energy is required. The recesses, or one of them, may be formed in the mounting bolt assembly if desired. This is particularly true of the inboard recess. The lands may engage, grip and slip on either the inner or outer adjacent wall, as shown in FIGS. 2 and 3. The resilient rings effectively seal the space therebetween so that ring 148 has a clean surface to engage. Seal 166 or 266 similarly provides a clean surface for ring 152 or 252.

The embodiments of the invention in which an exclusive property or privilege is claimed are defined as follows:

1. In a disc brake caliper mounting for a brake having a disc, a caliper housing extending axially and circumferentially over a part of the disc and provided with at least one mounting orifice, a fixed support for the caliper housing, at least one mounting bolt means extending axially parallel to the axis of the disc and fixedly secured to the fixed support and extending into the at least one mounting orifice with the radially adjacent walls of the orifice and bolt means being in radially spaced relation, and annular resilient rings received about said bolt means in axially spaced relation to each other, said rings also being in friction engaging relation with and being radially compressed between the radially adjacent walls of the orifice and the bolt means, the improvement wherein:

at least one of said resilient rings is cylindrically formed with one end portion having a continuous cylindrical first peripheral surface and a multiple land-and-groove second peripheral surface defining a plurality of lands and grooves with only the land portions of the second peripheral surface frictionally engaging one of said radially adjacent walls, said land portions being axially deformed under axial loading to store retractive energy during brake application and acting upon brake release to utilize said stored retractive energy to retract the caliper housing relative to the fixed support, and said at least one resilient ring including a generally cylindrical flexible extension extending axially outwardly of said orifice from said one end portion and terminating with an extension outer end, said extension being of less thickness than the radial spacing between said radially adjacent walls to provide for axial and radial flexure, said extension covering at least a substantial portion of said bolt means extending outwardly of said orifice and having said extension outer end secured to said bolt means against movement of said extension outer end relative to said bolt means, said extension providing an axially and radially flexible seal protecting the bolt means surface which can engage said ring one end portion as the brake is actuated and as the brake shoes wear.

* * * * *